United States Patent [19]
Bengtsson

[11] 3,852,855
[45] Dec. 10, 1974

[54] FASTENING ELEMENT FOR ONE END OF A BAND

[76] Inventor: Sigurd Walter Bengtsson, Bruksgatan 17, Gothenburg, Sweden

[22] Filed: Nov. 24, 1972

[21] Appl. No.: 309,425

[30] Foreign Application Priority Data
Nov. 29, 1971 Sweden.............. 15233/71

[52] U.S. Cl............ 24/265 EE, 403/353, 24/115 R, 24/170
[51] Int. Cl..................... A44c 5/18, F16g 11/00
[58] Field of Search.......... 24/123 B, 123 A, 114.5, 24/265 EE, 128, 265 R, 265 BC, 73 A; 16/114 B; 403/353

[56] References Cited
UNITED STATES PATENTS

| | | | |
|---|---|---|---|
| 42,090 | 3/1864 | Lanergan | 24/128 R |
| 534,165 | 2/1895 | Lee | 403/353 |
| 1,258,140 | 5/1918 | Pleister | 24/123 A |
| 1,267,430 | 5/1918 | McConnell | 403/353 |
| 1,413,247 | 4/1922 | Wilson | 24/128 R |
| 1,484,557 | 2/1924 | Latham | 24/165 |
| 2,591,925 | 4/1952 | Erbe | 24/123 A |
| 3,083,428 | 4/1963 | McGill | 24/114.5 |
| 3,264,017 | 8/1966 | Lagarde | 24/123 B |
| 3,409,950 | 11/1968 | Boyd | 24/123 A |
| 3,608,158 | 9/1971 | Bengtsson | 24/170 |

FOREIGN PATENTS OR APPLICATIONS

| | | | |
|---|---|---|---|
| 22,869 | 12/1912 | Norway | 24/128 R |

*Primary Examiner*—Bernard A. Gelak
*Attorney, Agent, or Firm*—Hill, Gross, Simpson, Van Santen, Steadman, Chiara & Simpson

[57] ABSTRACT

A fastening element for attachment to one end of a band includes a body, which may form part of a buckle, having a band-receiving channel extending inwardly from one end, and a recess extending inwardly from an adjacent side and intersecting the inner end of the channel, the recess being defined in part by a side wall opposite to the inner end of the channel, and preferably including an inclined band guide surface at the entrance to the recess. A band having an enlarged bead is fed through the recess and through the channel and the bead is trapped between the inner end of the channel and the opposite side wall.

1 Claim, 5 Drawing Figures

PATENTED DEC 10 1974  3,852,855
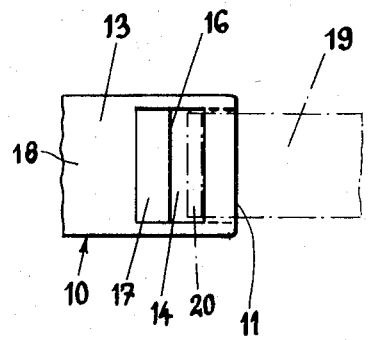
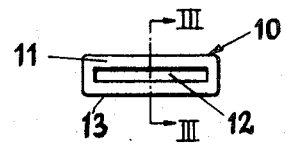
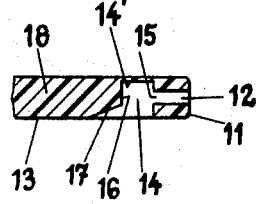
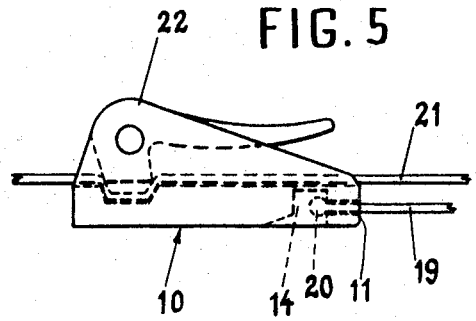
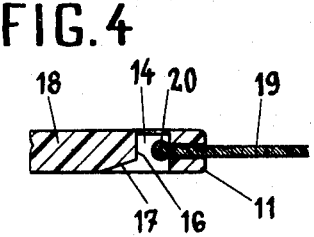

FASTENING ELEMENT FOR ONE END OF A BAND

BACKGROUND OF THE INVENTION

1. Field of the Invention

This invention pertains to a construction for fastening one end of a fastener, such as a buckle, to a band or strap.

2. Prior Art

As shown in my U.S. Pat. No. 3,608,158, it has been known to anchor a band on a fastening element such as the base plate of a buckle. In such construction, a closed loop is provided at one end of the band and the loop passes through an aperture in the plate. Also, it has been common to secure the end of the band to the buckle plate by one or more rivets. In these types of construction, the anchoring of the band end is relatively troublesome and in most cases it cannot be performed by the user of the band.

SUMMARY OF THE INVENTION

In accordance with the present invention a fastening element is provided to cooperate with a beaded end of a band, the fastening element comprising a body having a channel extending from an end surface thereof into the interior thereof and receptive of the band; means defining a recess in said body extending to said channel from an adjacent side surface thereof laterally of the longitudinal axis of said channel, said recess having a size receptive of one end of the band to enable insertion of said one end of the band through said recess and then through said channel in one direction for anchoring the beaded end of the band at the inner end of said channel.

Accordingly, it is an object of the present invention to provide an improved fastening element for one end of a band.

A further object of the present invention is to provide a fastening element which simplifies and facilitates the anchoring of the band thereon so that the user can attach the band to the element easily.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWINGS

FIG. 1 is a bottom plan view of a fastening element provided in accordance with the principles of the present invention with a band shown assembled therewith by dot-and-dashed lines;

FIG. 2 is an end view of the fastener of FIG. 1;

FIG. 3 is a cross sectional view taken along the line III—III of FIG. 2;

FIG. 4 is similar to FIG. 3 and illustrates a band having a beaded end attached thereto; and FIG. 5 is a side elevational view of the fastening element embodied as part of a band and buckle assembly.

AS SHOWN ON THE DRAWINGS

The principles of this invention are particularly useful when embodied in a fastening element such as illustrated in FIG. 1, generally indicated by the numeral 10.

The fastening element comprises a body 18 which preferably comprises rigid plastic, and which in this embodiment has the shape of the plate portion of a buckle. The body 18 has an end surface 11 through which a peripherally closed channel 12 extends. The body 10 has an adjacent side surface 13 which has a recess 14 extending into the body 18, and the recess 14 terminating at its inner end at 14', and short of such inner end, intersecting with the inner end 15 of the channel 12. The recess 14 thus comprises an entrance opening on the side surface 13. The side surface 13 is substantially parallel with the longitudinal direction or axis of the channel 12. At a suitable distance from the inner end 15 of the channel 12, the recess 14 is defined in part by a side wall 16 which forms an appropriate angle with respect to the longitudinal axis of the channel 12. The size of this angle is illustrated as being substantially 90°. The entry opening or recess 14 for the flexible band from the side surface 13 is preferably widened in such a manner that an outer wall portion serves as a band guide surface 17 remote from the inner end 15 of the channel 12, the guide surface 17 inclining toward the inner end 15 of the channel 12.

One end 21 of the band 19 is plain while the other end 20 comprises an enlarged bead thereon. The bead 20 of the band 19 is anchored onto the fastening element 10 and the other end 21 of the band 19 is received detachably with a buckle 22 or the like. The band 19 may be of any conventional character with the exception that the enlarged bead 20 is provided at said other end for anchoring to the fastening element 10. This end or bead 20 of the band is formed as a substantially non-resilient bead or head portion that has a greater diameter than the height of the inner end 15 of the channel 12. Although the bead may be provided in other ways, the band is preferably made from a material which can be shaped by heat, such as the plastic material known under the proprietary name of TERYLENE. A preferred method to produce the bead 20 is to thermally soften a relatively short end portion of the band 19 followed by solidification of the softened material, preferably in a mold, whereby a hard and strong bead with a strong connection with the remaining part of the band is obtained.

When the band 19 is to be connected to the fastening element 10, the plain end portion 21 of the band 19 is directed at an oblique angle to the side surface 13 by the guide surface 17 at the entrance opening of the recess 14, the end portion being then inserted through the recess 14 and through the inner end 15 of the channel 12, and is further pushed through the channel 12 through its outer end. The end of the band 19 that projects through the channel 12 may then be gripped by hand and the band can then be pulled through the recess 14 and the channel 12 until the movement is arrested by the bead 20 which has a size and material which do not permit pulling of the bead 20 through the channel 12. Thus the bead end 20 is safely anchored in the recess 14, and if the band 19 is pushed back into the fastening element 10, the wall 16 of the recess limits any such reverse movement. Only by the aid of a special instrument can the end of the band that has the bead 20 be gripped and moved back out of the recess 14 for removal of the band 19 from the fastening element 10.

FIG. 5 shows by way of an example the manner of using the fastening element 10 as the base plate of the buckle 22. Other particulars of the buckle 22 are shown in my U.S. Pat. No. 3,608,158. The construction of the buckle 22 may be other than that shown in the drawing. The present invention may be utilized in connection with other articles and is not restricted to a special use, another aspect of the present invention being the combined fastening element 10 and the band 19.

Although various minor modifications may be suggested by those versed in the art, it should be understood that I wish to embody within the scope of the patent warranted hereon all such embodiments as reasonably and properly come within the scope of my contribution to the art.

I claim as my invention:

1. A fastening element for receiving the beaded end of a knot-free band of rectangular cross-section, comprising: a onepiece rigid body having a channel of a rectangular cross-sectional size complemental to and receptive of the band, said channel extending from an end surface thereof into said body and terminating therein, there being an enlarged recess in said body at the inner end of said channel, said recess opening otherwise only at an adjacent side surface of said body and being of a size receptive of the beaded end of the band, said recess being defined in part by an internal transverse wall in the body facing the inner end of said channel and disposed in proximity thereto, whereby the structure of the fastening element restrains the beaded end of the band against significant movement in either longitudinal direction, and said body having a sloping lead-in surface for the band, said lead-in surface extending from said adjacent side surface and intersecting said transverse wall along a line such that said lead-in surface cannot be engaged by the bead for disconnection with deflection of the band with a tool.

* * * * *